United States Patent
Smith

(10) Patent No.: US 11,619,530 B2
(45) Date of Patent: Apr. 4, 2023

(54) SYSTEM AND METHOD FOR DETECTING AN OPERATIONAL STATUS OF A TOOL OF AN AGRICULTURAL IMPLEMENT BASED ON FLUID FLOW

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

(*) Notice: Subject to any disclaimer, the term of this patent is extended or adjusted under 35 U.S.C. 154(b) by 626 days.

(21) Appl. No.: 16/653,343

(22) Filed: Oct. 15, 2019

(65) Prior Publication Data

US 2021/0108951 A1 Apr. 15, 2021

(51) Int. Cl.
| | | |
|---|---|---|
| *A01B 79/00* | (2006.01) | |
| *G01F 1/704* | (2006.01) | |
| *A01C 5/06* | (2006.01) | |
| *A01B 63/24* | (2006.01) | |
| *A01B 31/00* | (2006.01) | |
| *A01C 15/00* | (2006.01) | |
| *A01B 49/02* | (2006.01) | |

(52) U.S. Cl.
CPC .............. *G01F 1/704* (2013.01); *A01B 31/00* (2013.01); *A01B 63/24* (2013.01); *A01B 79/00* (2013.01); *A01C 5/062* (2013.01); *A01C 15/00* (2013.01); *A01B 49/027* (2013.01)

(58) Field of Classification Search
CPC ....... A01B 31/00; A01B 63/24; A01B 49/027; A01C 5/062; A01C 15/00; G01F 1/704
See application file for complete search history.

(56) References Cited

U.S. PATENT DOCUMENTS

| | | |
|---|---|---|
| 7,669,538 B2 | 3/2010 | Memory |
| 8,893,630 B2 | 11/2014 | Kowalchuk |
| 8,928,486 B2 | 1/2015 | Hui |
| 9,405,039 B2* | 8/2016 | Anderson ............ A01B 71/08 |
| 9,485,900 B2 | 11/2016 | Connell |
| 9,565,798 B2 | 2/2017 | Baker |
| 9,615,506 B2 | 4/2017 | Ruppert |
| 9,989,393 B2* | 6/2018 | Hossain ................ G01F 25/10 |
| 10,255,670 B1* | 4/2019 | Wu ........................ H04N 7/183 |

(Continued)

FOREIGN PATENT DOCUMENTS

CN 102106210 1/2011

*Primary Examiner* — Jamie L McGowan
(74) *Attorney, Agent, or Firm* — Rebecca Henkel; Rickard DeMille

(57) ABSTRACT

A system for detecting the operational status of ground engaging tools for agricultural implements includes an agricultural implement including a frame and a ground engaging tool coupled to the frame. The system further includes one or more sensors supported relative to the frame. The sensor(s) are configured to capture data indicative of a fluid flow past the ground engaging tool as the agricultural implement is moved across the field. The system further includes a controller configured to monitor the data received from the sensor(s) and identify an operational status of the ground engaging tool based at least in part on a comparison between one or more monitored values associated with the fluid flow past the ground engaging tool as the agricultural implement is moved across the field and a predetermined threshold value.

20 Claims, 6 Drawing Sheets

(56) References Cited

U.S. PATENT DOCUMENTS

| | | | |
|---|---|---|---|
| 11,058,045 B2* | 7/2021 | Harmon | A01B 79/005 |
| 2013/0061790 A1 | 3/2013 | Binsirawanich | |
| 2014/0048296 A1* | 2/2014 | Bassett | A01C 7/203 |
| | | | 172/4 |
| 2016/0029547 A1* | 2/2016 | Casper | A01B 63/004 |
| | | | 701/50 |
| 2018/0255698 A1 | 9/2018 | Körösi | |
| 2019/0150357 A1* | 5/2019 | Wu | G06T 7/73 |
| 2021/0059094 A1* | 3/2021 | Barrick | A01B 63/008 |
| 2021/0108951 A1* | 4/2021 | Smith | G01F 1/704 |
| 2021/0259149 A1* | 8/2021 | Zemenchik | A01B 79/005 |

* cited by examiner

200 ⟶

┌─────────────────────────────────────────────┐
│ MONITOR A FLUID FLOW PAST THE GROUND ENGAGING TOOL │
│ AS THE AGRICULTURAL IMPLEMENT IS BEING MOVED ACROSS │ — 202
│ THE FIELD │
└─────────────────────────────────────────────┘
                    ↓
┌─────────────────────────────────────────────┐
│ COMPARE AT LEAST ONE MONITORED VALUE ASSOCIATED │
│ WITH THE FLUID FLOW PAST THE GROUND ENGAGING TOOL │
│ AS THE TILLAGE IMPLEMENT IS MOVED ACROSS THE FIELD TO │ — 204
│ A PREDETERMINED THRESHOLD VALUE SET FOR THE GROUND │
│ ENGAGING TOOL │
└─────────────────────────────────────────────┘
                    ↓
┌─────────────────────────────────────────────┐
│ IDENTIFY AN OPERATIONAL STATUS OF THE GROUND │
│ ENGAGING TOOL BASED AT LEAST IN PART ON THE │ — 206
│ COMPARISON BETWEEN THE AT LEAST ONE MONITORED │
│ VALUE AND THE PREDETERMINED THRESHOLD VALUE │
└─────────────────────────────────────────────┘

FIG. 6

SYSTEM AND METHOD FOR DETECTING AN OPERATIONAL STATUS OF A TOOL OF AN AGRICULTURAL IMPLEMENT BASED ON FLUID FLOW

FIELD OF THE INVENTION

The present disclosure generally relates to agricultural implements and, more particularly, to systems and methods for detecting the operational status of ground engaging tools of an agricultural implement based on a fluid flow past the ground engaging tools.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

However, in certain situations, the ground engaging tools may become plugged with debris and no longer efficiently engage the ground. For example, dirt clogs or left over crop residue may become trapped between the ground engaging tool and the ground and reduce a desired penetration depth of the ground tools. As another example, the plug may form in front of a ground engaging tool relative to a direction of travel of the tillage implement. As such, the ground engaging tool may plow such plug and thereby suffer from undesirable loading and premature mechanical failure. Further, a plugged ground engaging tool may lead to an undesirable surface finish compared to the surface finish achievable with a fully operation ground engaging tool. For example, a plugged ground engaging tool may not sufficiently mix the soil and residue within the field and negatively impact the performance of subsequent agricultural operations, such as planting or seeding.

Accordingly, an improved system and method for detecting the operational status of ground engaging tools of an agricultural implement, such as a plugged condition of the tools, would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting the operational status of ground engaging tools for agricultural implements. The system includes an agricultural implement including a frame and a ground engaging tool coupled to the frame. A ground engaging portion of the ground engaging tool is configured to engage soil within a field as the agricultural implement is moved across the field. The system further includes one or more sensors supported relative to the frame. The sensor(s) is configured to capture data indicative of a fluid flow past the ground engaging tool as the agricultural implement is moved across the field. The system further includes a controller configured to monitor the data received from the sensor(s) and identify an operational status of the ground engaging tool based at least in part on a comparison between one or more monitored values associated with the fluid flow past the ground engaging tool as the agricultural implement is moved across the field and a predetermined threshold value.

In another aspect, the present subject matter is directed to a method for detecting the operational status of a ground engaging tool of an agricultural implement. The method includes monitoring, with the computing device, a fluid flow past the ground engaging tool as the agricultural implement is moved across the field. The method further includes comparing one or more monitored values associated with the fluid flow past the ground engaging tool as the agricultural implement is moved across the field to a predetermined threshold value set for the ground engaging tool. Additionally, the method includes identifying an operational status of the ground engaging tool based at least in part on the comparison between the monitored value(s) and the predetermined threshold value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for detecting the operational status of a ground engaging tool of an agricultural implement in accordance with aspects of the present subject matter.

Figure 1:
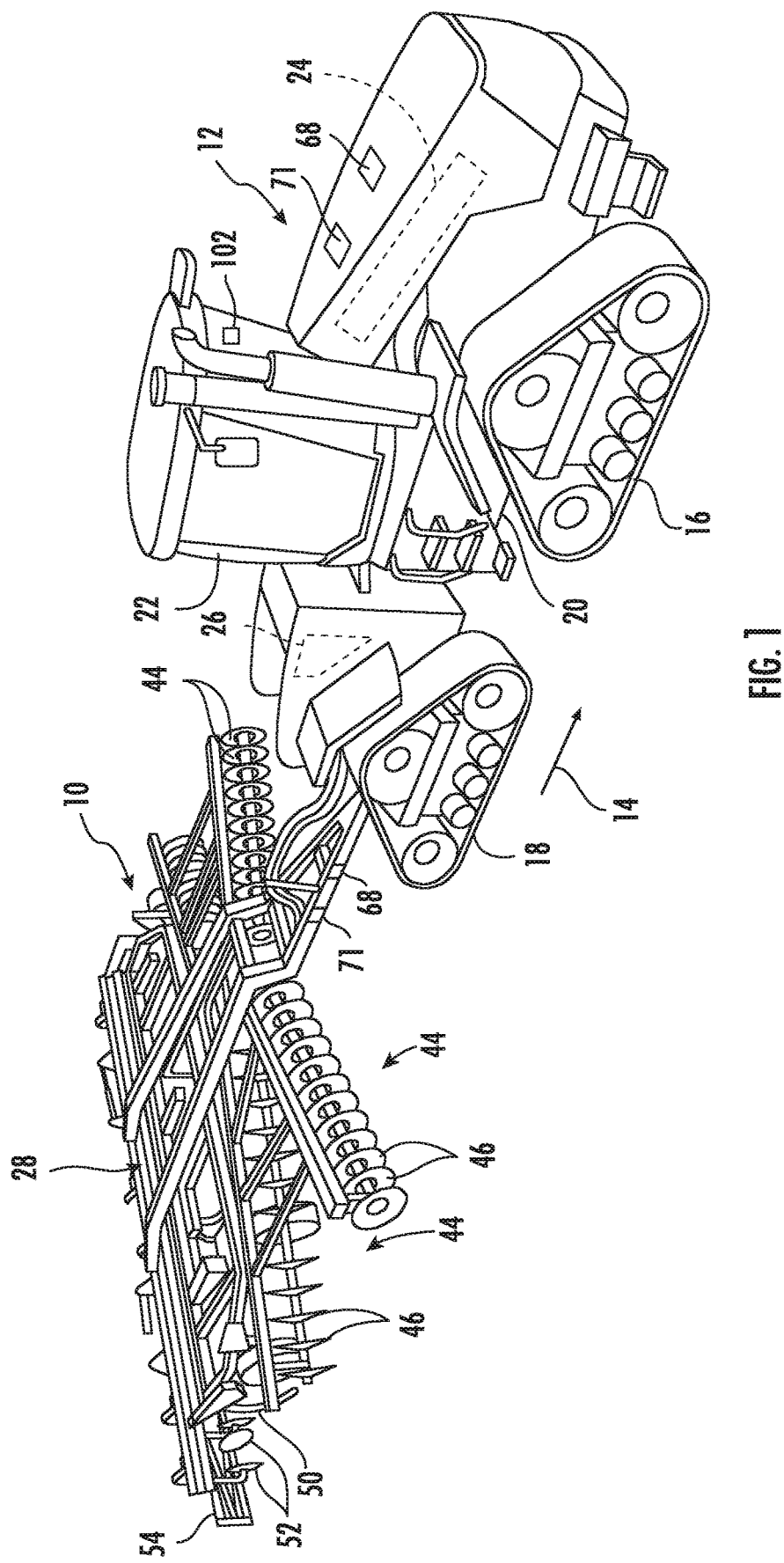
FIG. 1 illustrates a perspective view of one embodiment of an agricultural implement being towed by a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the operational status of a ground engaging tool of an agricultural implement. Specifically, in several embodiments, a controller of the disclosed system may be configured to receive data indicative of a fluid flow past the ground engaging tool, such as a shank supported by a frame of the agricultural implement, as the implement is moved across the field. The fluid flow past the ground engaging tool may, in turn, be indicative of the operational status of the ground engaging tool. For instance, the controller may be configured to monitor the data received from one or more sensors associated with the ground engaging tool and compare a monitored value indicative of the fluid flow past the ground engaging tool to a predetermined threshold value set for the tool.

In several embodiments, the operational status being monitored may be associated with clogging or plugging of the ground engaging tool. Specifically, a deviation in a monitored speed and/or direction of the fluid flow past the ground engaging tool as the implement is being towed across the field to perform a cultivating operation may be indicative of plugging of the ground engaging tool, such as when the monitored value surpasses a set maximum value, falls below a set minimum value, and/or when the monitored value falls outside of a predetermined threshold range. As such, the controller may be configured to identify that the ground engaging tool is plugged when the monitored fluid flow-related value differs from the predetermined threshold value set for the ground engaging tool. The identification of a plugged ground engaging tool may allow for the operator to take corrective action. Alternatively, the controller may be configured to automatically execute a corrective action adapted to unplug the ground engaging tool.

It should be appreciated that, although the present subject matter will generally be described herein with reference to the detection of a plugged or clogged condition for ground engaging tools, the disclosed system and method may also be used to identify any other parameter associated with an operational status of a ground engaging tool based on the detected fluid flow past such tool. For instance, the identified operational status of a ground engaging tool may relate to the penetration depth of the tool, the effectiveness of the tool in working the soil, and/or the like.

Figure 2:
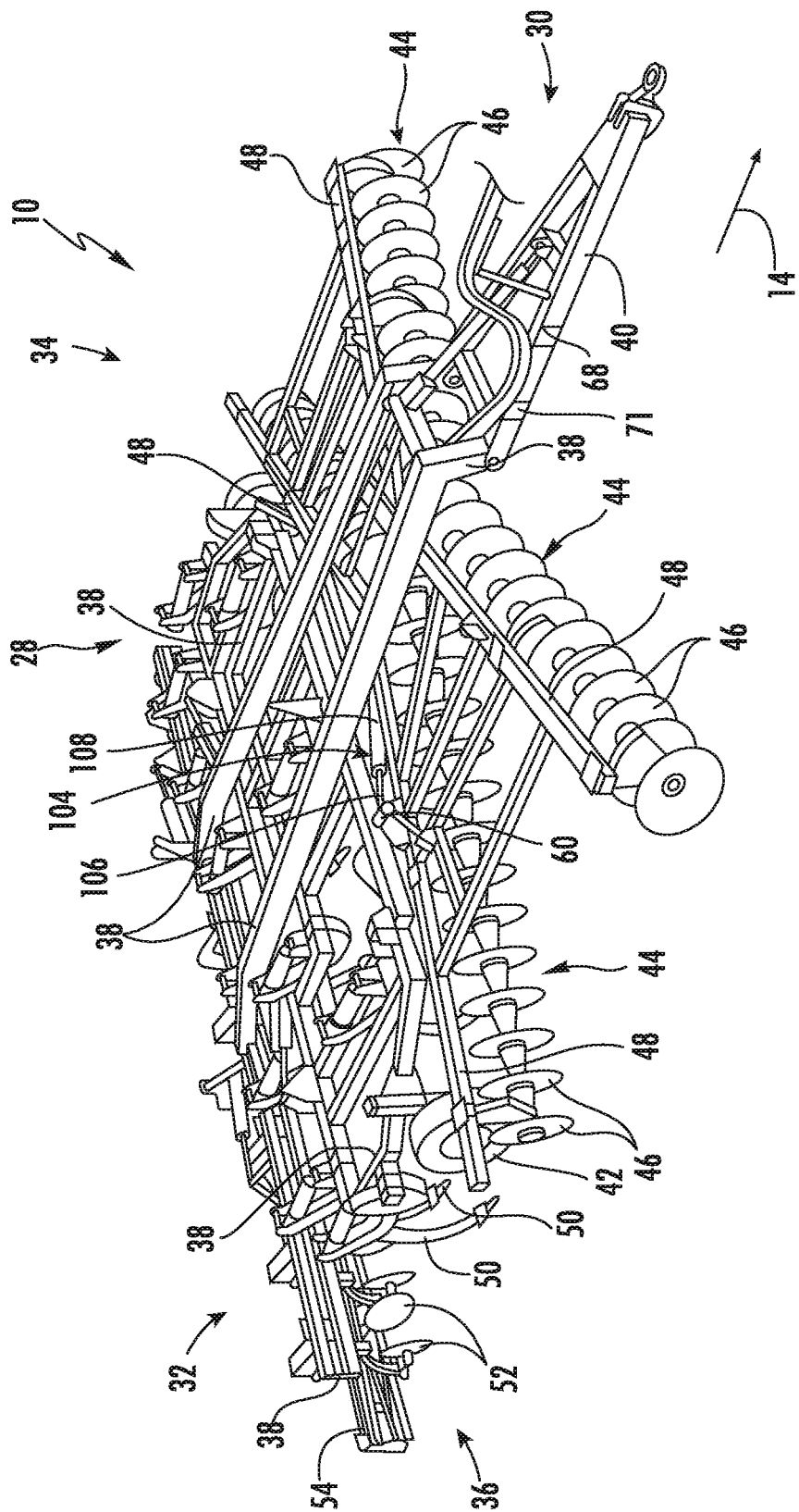
FIG. 2 illustrates an alternative perspective view of the agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14. As further illustrated, at least one of the work vehicle 12 or the implement 10 may include a sensor 71 configured to provide data indicative of a speed of the agricultural implement 10 as the agricultural implement 10 is moved across the field, such as a ground speed sensor providing data indicative of the ground speed of the implement 10 and/or the work vehicle 12. As shown particularly in FIG. 1, at least one of the work vehicle 12 or the implement 10 may also include a sensor 68 configured to provide data indicative of a location of the agricultural implement 10 as the agricultural implement 10 is moved across the field, such as a global positioning system (GPS) sensor providing data indicative of the location of the agricultural implement 10 and/or the work vehicle 12.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in other embodiments, the disc gang assemblies 44 may be mounted to the frame 28 at any other suitable location, such as adjacent to its aft end 32.

Moreover, in several embodiments, the implement 10 may include a plurality of actuators 104 (one is shown in FIG. 2), with each actuator 104 being configured to move or otherwise adjust the orientation or position of one of the disc gang assemblies 44 relative to the implement frame 28. While illustrated in association with the disc gang assemblies 44, it should be appreciated that one or more actuators 104 may be provide in association with each ground engaging tool or multiple ground engaging tools, such as shank(s) 50, in order to alter an orientation or position of one or more of the ground engaging tools relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. Furthermore, the rod 106 of each actuator 104 may be configured to extend and/or retract relative to the corresponding cylinder 108 to adjust a force applied by the actuator(s) 104 to the disk gang assembly 44, and thus the disc blades 46. In the illustrated embodiment, each actuator 104 corresponds to a fluid driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground engaging tools. For instance, in the illustrated embodiment, the frame 28 is also configured to support a plurality of leveling blades 52 and rolling (or crumbler) basket assemblies 54. In other embodiments, any other suitable ground engaging tools may be coupled to and supported by the implement frame 28, such as a plurality closing discs.

It should also be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
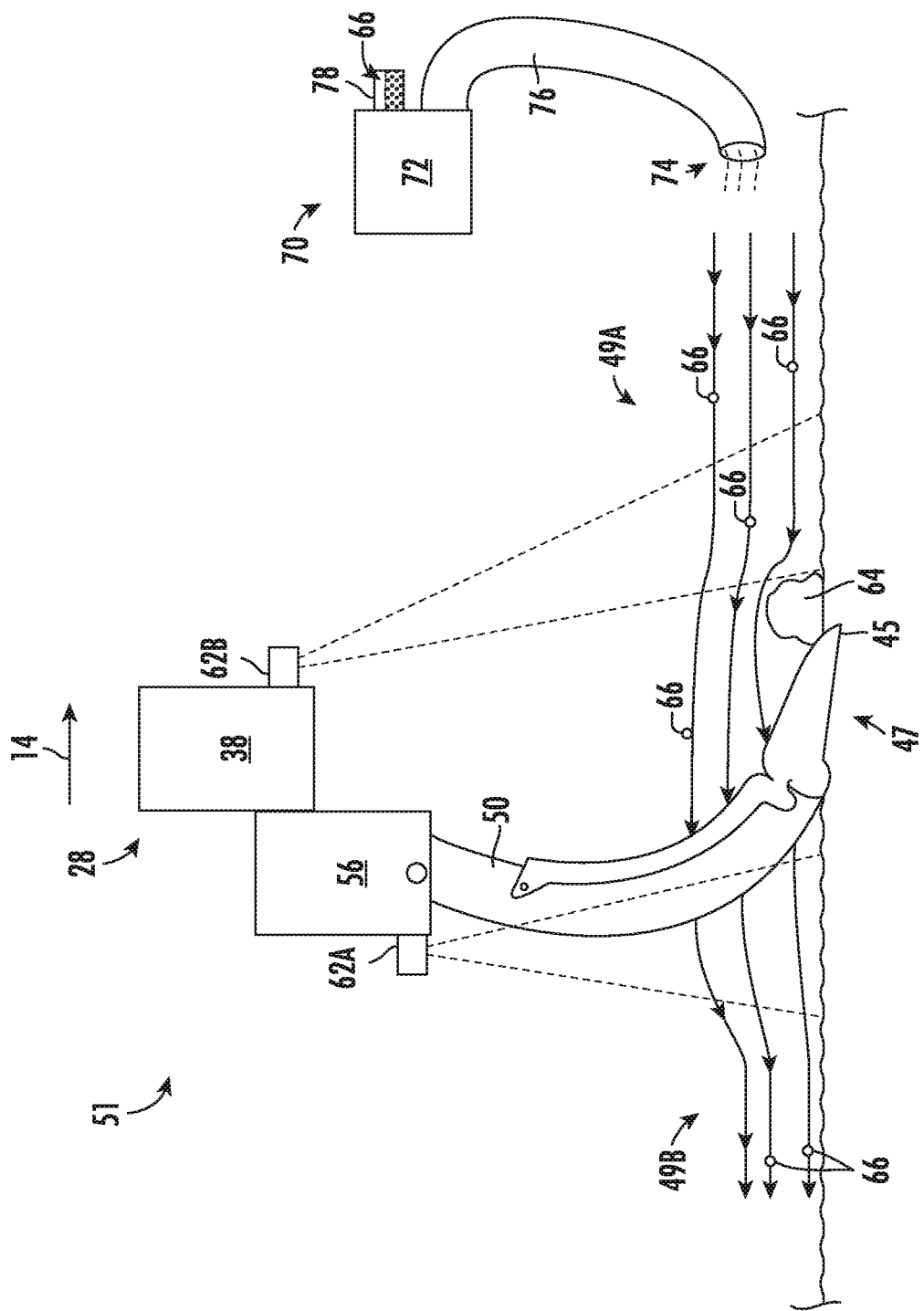
FIG. 3 illustrates a schematic side-view of a shank assembly including a shank of an agricultural implement in accordance with aspects of the present subject matter, particularly illustrating sensors supported relative to the shank for sensing a fluid flow around the shank.

Referring now to FIG. 3, a side-view of a shank assembly 51 including one of the shanks 50 of the agricultural implement 10 described above with reference to FIGS. 1 and 2 is illustrated schematically in accordance with aspects of the present subject matter. Further, FIG. 3 illustrates one or more fluid flow sensors 62 (e.g., two sensors 62 in the embodiment of FIG. 3) associated with the shank 50. However, it should be appreciated that the aspects of the present subject matter described herein with reference to FIG. 3 may also be utilized with any ganged tool assembly including any other suitable ground engaging tools of a given agricultural implement 10 or individual ground engaging tools coupled directly to the frame 28. Furthermore, although FIG. 3 illustrates a single shank assembly 51, it should be recognized that the following disclosure is generally applicable to a ganged tool assembly including multiple ground engaging tools, such as the disc gang assembly 44 (FIGS. 1 and 2).

As shown in FIG. 3, one or more sensors 62 may be supported relative to the shank assembly 51, with each sensor 62 being configured to detect a fluid flow and/or one or more characteristics of the fluid flow (represented by stream lines 49) past the shank 50 as the agricultural implement is moved across the field, such as in the direction of travel 14. For example, the fluid flow sensor(s) 62 may be arranged to detect the fluid flow 49 past and/or directly above a ground engaging portion 47 of the shank 50 or between two shanks 50 (see FIG. 4) of the agricultural implement 10. For instance, the sensor(s) 62 may be configured to detect a speed or direction of the fluid flow past the shank 50 as the implement 10 is being moved across the field and transmit associated fluid flow data to a corresponding system controller 128 (such as via one or more communicative links 136 as shown in FIG. 5). For instance, accumulated material relative to the shank 50 (e.g., material plug 64 disposed in front of the ground engaging portion 47) may create and/or enlarge a stagnation zone within the fluid flow 49 around the shank 50 and thus cause a change in the speed of the fluid flow 49, such a reduction in the speed at a location aft and/or forward of the ground engaging portion 47.

Generally, in the illustrated embodiment, the speed of the fluid flow 49 may be qualitatively illustrated by the distance between the streamlines of the fluid flow 49. As shown, the fluid flow 49 forward of the ground engaging portion 47 (forward fluid flow 49A) may generally flow at in increased speed relative to the fluid flow 49 aft of the ground engaging portion 47 (aft fluid flow 49B) due to the plug 64 and/or the shank 50 itself. However, the existence of the plug 64 may increase the impact of the shank 50 on the fluid flow 49. As such, a plug 64 may create a larger stagnation zone and thus a slower speed of the aft fluid flow 49B than expected, indicating a plugged condition of the shank 50. However, it should also be appreciated that the reduction in the speed of the aft fluid flow 49B due to the stagnation zone is necessarily associated with an acceleration of the fluid flow 49 at other locations such that the mass flow forward and aft of the shank 50 remains the same. Thus, an increase in the speed of the fluid flow 49 at certain locations, such as at the plug 64 and/or between shanks 50 (see FIG. 4) may also indicate a plugged condition of the shank 50.

As another example, such plug 64 may cause a larger than expected differential between the speed of the forward fluid flow 49A and aft fluid flow 49B relative the direction of travel 14. As still another example, the plug 64 may alter a direction of the fluid flow 49 either forward, aft, or both of the ground engaging portion 47 of the shank 50.

In one embodiment, the fluid flow sensor(s) 62 may correspond to one or more cameras, optical sensors, RADAR sensors, ultrasonic transceivers (either as single unit or separate ultrasonic transmitter(s) and receiver(s)), or motion detectors supported relative to the shank 50 so as to allow the sensor(s) 62 to detect the fluid flow 49 past the shank 50 as the shank 50 is being pulled through the ground. Alternatively, the sensor(s) 62 may be configured as one or more pressure sensors or picot tubes configured to detect a pressure of the fluid flow 49 that may be correlated to other characteristics of the fluid flow 49, e.g., the speed of the fluid flow 49. As such, a plugged condition of the shank 50 may be inferred by comparing a characteristic of the fluid flow 49, such as the speed, the speed differential forward and aft of the shank 50, or direction of the fluid flow 49, to predetermined threshold value(s) defined or selected for such characteristics.

As shown in the illustrated embodiment, the shank assembly 51 includes both the shank 50 and associated attachment structure 56 for pivotally coupling the shank 50 to the implement frame 28. For instance, the shank 50 may be sandwiched between members or other suitable components of the attachment structure 56. As shown in FIG. 3, the shank 50 may include a tip end 45 that is configured to penetrate into or otherwise engage the ground as the implement 10 is being pulled through the field (e.g., ground engaging portion 47). In one embodiment, the shank 50 may be configured as a chisel. However, one of ordinary skill in the art would appreciate that the ground-engaging tool may be configured as a sweep, tine, or any other suitable ground-engaging tool. It should also be appreciated that an auxiliary attachment may also be coupled to the shank 50 at its tip end 45, such as a point attachment. Additionally, an actuator (e.g., actuator 104 FIG. 1) and/or one or more biasing elements (omitted for clarity) may be provided in association with the attachment structure 56 to bias the shank 50 to a predetermined ground-engaging tool position (e.g., a home or base position) relative to the frame 28. In general, the predetermined ground-engaging tool position may correspond to a ground-engaging tool position in which the shank 50 penetrates the soil to a desired depth. The actuator or biasing element(s) may also allow the shank 50 to pivot away from the predetermined ground-engaging tool position (e.g., to a shallower depth of penetration), when encountering rocks or other impediments in the field.

As shown in FIG. 3, in various embodiments, a first fluid flow sensor 62A may be oriented to detect the fluid flow 49 aft of the ground engaging portion 47 of the shank 50 relative to the direction of travel 14. Further, a second fluid flow sensor 62B may be oriented to detect the fluid flow 49 forward of the ground engaging portion 47. However, it should be appreciated that more than two fluid flow sensors 62, such as three or more sensors 62, may be provided to detect the fluid flow 49 past the shank 50. Further, in another embodiment, a single fluid flow sensor 62 may be provided to detect the fluid flow 49 past the shank 50, such as the fluid flow 49 aft of the shank 50. As illustrated in FIG. 3, the sensor(s) 62 may, in one embodiment, be mounted directly or otherwise coupled to a component(s) of the shank assembly 51 and/or the frame 28. For instance, in the illustrated embodiment, the first fluid flow sensor 62A is coupled to support structure 56 (e.g., to a component or member of the support structure 56) and oriented to detect the fluid flow 49 aft the ground engaging portion 47 of the shank 50 relative to the direction of travel 14. As another example, as further shown in FIG. 3, the second fluid flow sensor(s) 62B is coupled to a portion of the frame 28 (e.g., to a structural frame member 38) and oriented to detect the fluid flow 49 forward of the shank 50. As a further example, not shown, the fluid flow sensor(s) 62 may be coupled directly to the shank 50, such as at or near the ground engaging portion 47.

Still referring to the exemplary embodiment of FIG. 3, in one embodiment, the fluid flow sensor(s) 62 may directly measure the fluid flow 49 caused by the forward movement 14 of the implement 10 and thus the shank 50. For instance, the sensor(s) 62 may be configured as one or more pressure sensors, picot tubes, or the like, and may directly detect the static and dynamic pressure of the fluid flow 49, which may be utilized to determine the speed of the fluid flow 49. As an alternative embodiment, the fluid flow sensor(s) 62 may instead track one or more tracer particles 66 within the fluid flow 49. During operation of the implement 10, various implement components, such as the ground engaging tools, wheels 42, and/or the work vehicle 12 and associated components may cause dust, dirt, debris, and/or other particulates to be stirred up within the air. Moreover, such particulates may be carried by the fluid flow 49. As such, rather than detecting the characteristic of the fluid flow 49 directly, the tracer particles 66 may instead be detected by the sensor(s) 66. Further, the motion of the tracer particles 66 may be indicative of the motion of the fluid flow 49. Thus, detecting the motion of the tracer particles 66 may allow the sensor(s) 66 to also detect the speed and/or direction of the fluid flow 49.

Generally, the fluid flow 49 may be caused by the forward motion 14 of the implement 10. More specifically, the movement of the implement 10 and thus the shank 50 relative to the ground and air may cause the fluid flow 49 relative to the shank 50. However, in certain situations, the work vehicle 12 may not tow the implement 10 at a sufficient speed to detect a plugged condition or other operational status of the shank 50 utilizing the fluid flow 49 over the ground engaging portion 47 caused by such forward motion 14. As such, optionally, a fluid flow system 70 may be provided in association with the implement 10. More particularly, the fluid flow system 70 may be configured to artificially introduce the fluid flow 49 or increase the fluid flow 49 at a location forward of the shank 50 such that the speed of the fluid flow 49 is sufficient for the sensor(s) 62 to detect the desired characteristics of the fluid flow 49.

As shown in FIG. 3, the fluid flow system 70 may include a flow generator 72. The flow generator 72 may generally be configured as a fan, compressor, pump, or the like configured to move a volume of fluid. In one embodiment, the flow generator 72 may correspond to a dedicated flow generation device coupled to the implement 10 and/or work vehicle 12 to provide increased fluid flow 49 to one or more of the ground engaging tools of the implement 10. As illustrated in FIG. 3, the fluid flow system 70 may also include a fluid outlet 74 positioned forward of the ground engaging portion 47 of the shank 50 in order to increase the fluid flow 49 passing over the ground engaging portion 47. Further, the fluid outlet 74 may be fluidly coupled to the flow generator 72, such as via one or more lines 76, in order to provide the fluid flow 49 from the flow generator 72 to the fluid outlet 74.

In an additional or alternative embodiment, the fluid flow system 70 may further be configured to introduce tracer particles 66 within the fluid flow 49. For instance, there may not be enough particulates introduced by the field for the sensor(s) 62 to detect the monitored characteristics of the fluid flow 49 to the degree desired or required. As such, the tracer particles 66, such as dust or colored dust, may be introduced at any point within the fluid flow system 70 such that the sensor(s) 62 may better detect the motion of the fluid flow 49. For instance, as shown, a hopper 78 may be provided in association with the flow generator 72 in order to introduce the tracer particles 66 within the fluid flow 49. However, in other embodiments, it should be appreciated that the tracer particles 66 may be introduced via any component of the fluid flow system 70, such as the line(s) 76 and/or fluid outlet(s) 74. Furthermore, tracer particles 66 introduced by the fluid flow system 70 may be artificial to the field. For instance, the tracer particles 66 may include, but are not limited to, one or more of glass beads, polystyrene particles, polyethylene particles, aluminum flakes, oil droplets, or any other particle of an appropriate size to be carried by the fluid flow 78 and suitable to be detected by the sensor(s) 62.

Figure 4:
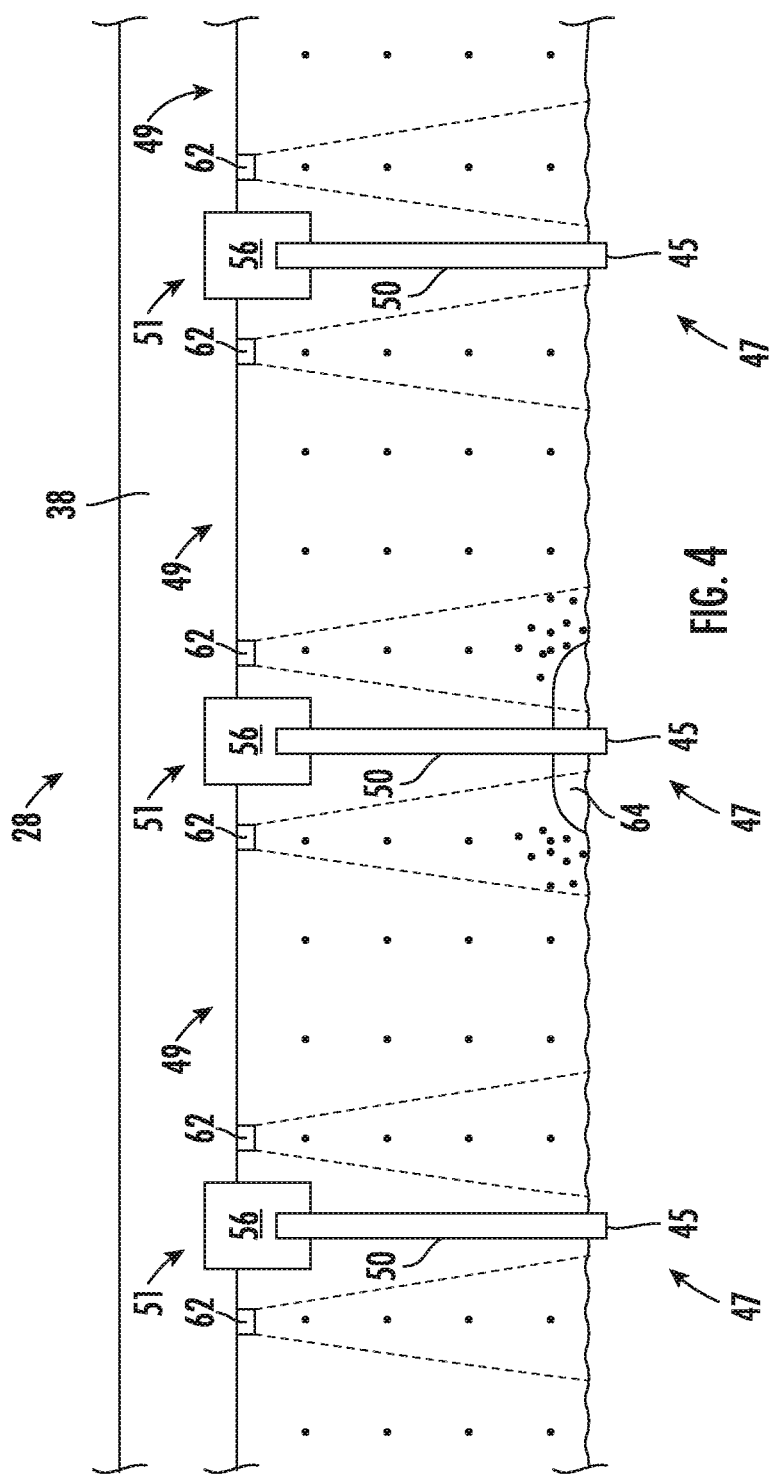
FIG. 4 illustrates a schematic rear-view of a plurality of shank assemblies and associated shanks in accordance with aspects of the present subject matter, particularly illustrating sensors positioned relative to the shank assemblies for sensing fluid flows therebetween.
Figure 5:
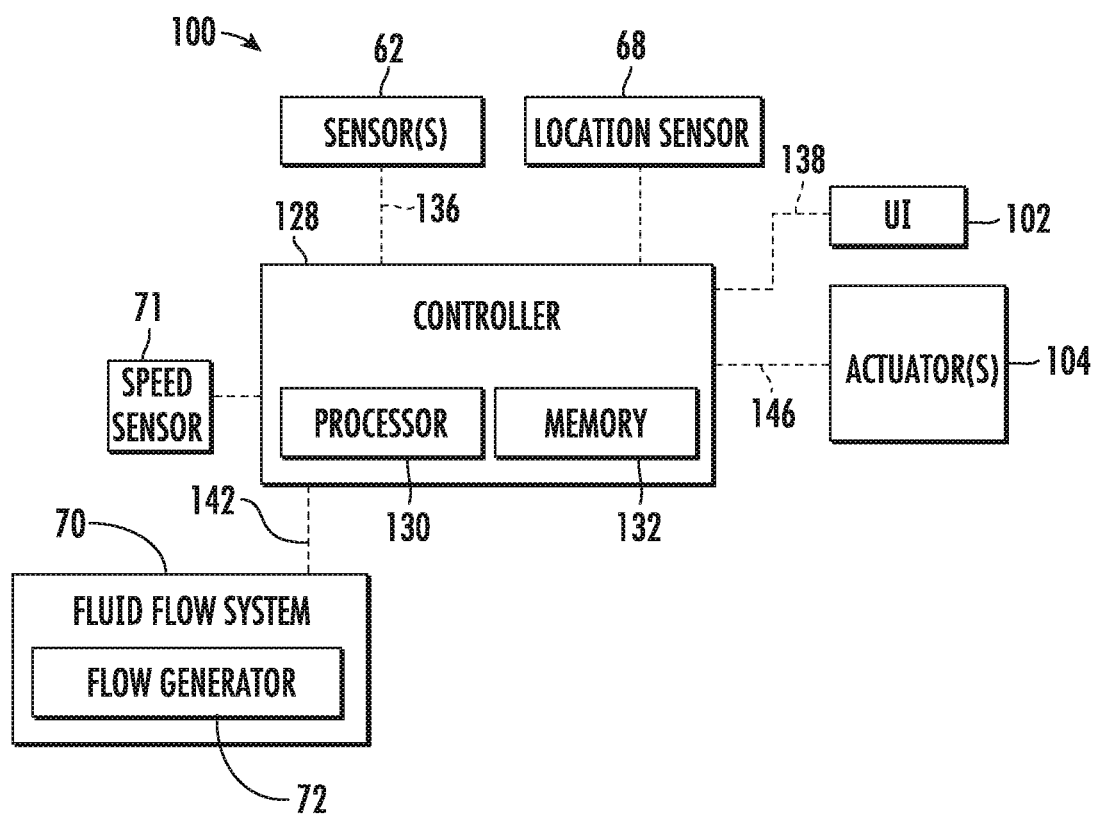
FIG. 5 illustrates a schematic view of one embodiment of a system for detecting the operational status of a ground engaging tool of an agricultural implement in accordance with aspects of the present subject matter.

Referring now to FIG. 4, a rear-view of an implement frame member 38 and a plurality of shank assemblies 51 provided in association with the frame member 38 as described in FIGS. 1-3 are illustrated schematically in accordance with aspects of the present subject matter. However, in the exemplary embodiment of FIG. 4, an alternative or additional placement of the fluid flow sensors 62 is illustrated, particularly showing the sensors 62 positioned between shank assemblies 51 and oriented to detect the fluid flow 49 (oriented in and out of the page and represented as dots in FIG. 4) between the shanks 50 of the shank assembly 51. However, it should be appreciated that the aspects of the fluid flow sensors 62 described herein with reference to FIG. 4 may also be utilized with any other ground engaging tools, ganged tool assembly including any other suitable ground engaging tools of a given agricultural implement 10, or individual ground engaging tools coupled directly to the frame 28.

As explained briefly above with reference to FIG. 3, the fluid flow 49 may generally be slowed in certain areas in response to the presence of material accumulation, such as material plug 64. However, in order to maintain the same flow rate through the implement 10, the fluid flow 49 may be accelerated in other areas. For instance, the fluid flow 49 between shanks 50 may be accelerated in order to accommodate localized areas of the fluid flow 49 that may be slowed by the plug 64. In such instance, a fluid flow sensor 62 may be provided on one or both sides of the shank(s) 50 and oriented to detect the fluid flow 49, or one or more characteristics of the fluid flow 49, along the sides of the ground engaging portion 47 of the associated shank 50. For example, an increase in the speed of the fluid flow 49 along the sides of the shank 50 may indicate a plugged condition for the shank 50. Further, as shown in FIG. 4, the fluid flow sensor(s) 62 may be placed adjacent to the attachment structure 56 on one or both sides of the attachment structure 56. However, in other embodiments, it should be appreciated that the one or more of the sensors 62 may be placed an equal or approximately equal distance between shanks 50 such that the sensor(s) 62 is able to detect the fluid flow 49 between ground engaging portions 47 of adjacent shanks 50.

It should be appreciated that FIGS. 3-4 provide examples of various different locations for mounting fluid flow sensors 62 in association with one or more ground engaging tools, such as shanks 50. It should be appreciated that, in alternative embodiments, the sensor(s) 62 may be disposed at any other suitable location and/or may have any other suitable configuration for sensing or detecting a parameter indicative of the fluid flow 49 past the shank(s) 50. It should also be appreciated that, although the sensor(s) 62 has been described in the context of one or more shanks 50 and/or shank assemblies 51, one or more sensor(s) 62 may also, for example, be provided in operative association with the ground engaging tool(s) of a ganged tool assembly(ies) to allow the fluid flow past the respective ground engaging tool(s) to be monitored. Still further, one or more sensor(s) 62 may be provided, for example, in operative association with any other suitable individual ground engaging tools supported by an implement frame to allow the fluid flow past the associated the ground engaging tool(s) to be monitored.

Referring now to FIG. 5, a schematic view of one embodiment of a system 100 for detecting the operational status of one or more ground engaging tools of an agricultural implement is illustrated in accordance with aspects of the present subject matter. In general, the system 100 will be described herein with reference to the implement 10 and shank assemblies 51 described above with reference to FIGS. 1-4. However, it should be appreciated by those of ordinary skill in the art that the disclosed system 100 may generally be utilized with agricultural implements having any other suitable implement configuration, as well as ground engaging tools having any other suitable tool configuration.

As shown in FIG. 5, the system 100 may include one or more components of the agricultural implement 10 and/or the shank assembly 51 described above, such as the shanks 50 and/or other suitable ground engaging tools. Additionally, in several embodiments, the system 100 may include a controller 128 configured to be communicatively coupled to one or more fluid flow sensors 62 configured to capture data indicative of one or more operational parameters of the fluid flow 49 past one or more ground engaging tools, such as the sensor(s) 62 described above with reference to FIGS. 3 and 4.

In several embodiments, the controller 128 may be configured to electronically control the operation of one or more components of the implement 10. For instance, in response to an input indicating the implement 10 should be placed in a working state, the controller 128 may be configured to lower various ground engaging tools of the agricultural implement 10, such as the disc blades 46, shanks 50, leveling blades 52, and/or basket assemblies 54, and raise such ground engaging tools in response to an input indicating the implement 10 should be placed in a transport or traveling state.

In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 6. In addition, the controller 128 may also include various other suitable components, such as a communications circuit or module, one or more input/output channels, a data/control bus and/or the like.

It should be appreciated that the controller 128 may correspond to an existing controller of the implement 10 or the associated work vehicle 12 (FIG. 1) or the controller 128 may correspond to a separate processing device. For instance, in one embodiment, the controller 128 may form all or part of a separate plug-in module that may be installed within the implement 10 or associated work vehicle 12 to allow for the disclosed system 100 and method 200 to be implemented without requiring additional software to be uploaded onto existing control devices of the implement 10 or the associated work vehicle 12.

Furthermore, in one embodiment, the system 100 may also include a user interface 102. More specifically, the user interface 102 may be configured to provide feedback (e.g., notifications associated with the operational parameters or status of the shank assemblies 51, shanks 50, ganged disc assembly 44, the disc blades 46, and/or other components or ground engaging tools of the implement 10) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within a cab 22 of the work vehicle 12 configured to tow the implement 10 across the field. However, in alternative embodiments, the user interface 102 may have any suitable configuration and/or be positioned in any other suitable location.

In several embodiments, the controller 128 may be configured to monitor one or more operational parameters of the fluid flow 49 (FIGS. 3 and 4) associated with one or more ground engaging tools of the implement 10 (e.g. the shanks 50) as the implement 10 is being moved across the field. Specifically, with reference to the embodiment shown in FIGS. 3 and 4, the controller 128 may be communicatively coupled to the fluid flow sensor(s) 62 supported relative to the shanks 50 via a wired or wireless connection to allow operational parameter data (e.g., as indicated by dashed lines 136 in FIG. 5) to be transmitted from the sensor(s) 62 to the controller 128. As such, the controller 128 may be configured to determine or estimate the fluid flow 49 or one or more parameters associated with the fluid flow 49 past each shank 50 as the shank 50 is being pulled through the ground based on the data 136 received from the sensor(s) 62. For instance, the controller 128 may include a look-up table, suitable mathematical formula, and/or algorithms stored within its memory 132 that correlates the sensor data 136 to the fluid flow 49 past the shank 50 or one or more parameters of the fluid flow 49 past the shank 50, such as the speed or direction of the fluid flow 49. Furthermore, one or more of the sensors 62 may be configured to communicate sensor data 136 indicative of the fluid flow 49 past multiple shanks 50. As such, the controller 128 may be configured to process the data and distinguish the data associated with the respective shanks 50. Moreover, the controller 128 may be configured to determine or estimate the fluid flow 49 past the each respective shank 50 based on the data associated with the material flow past multiple shanks 50.

Generally, by monitoring the data 136 associated with the fluid flow 49 past a given shank 50, the controller 128 may be able to determine whether the shank 50 has become plugged or clogged. Specifically, during operation of the implement 10, the shanks 50 may penetrate and cultivate the soil as the agricultural implement 10 is towed across the field. As the agricultural implement is towed across the field, the fluid flow 49 passes by the shanks 50. However, in certain situations, the shank(s) 50 may become clogged with debris and no longer cultivate the soil or clear the debris causing such plug 64. In such a situation, certain portions of the fluid flow 49 may be slowed due to one or more stagnation areas associated with the plug 64. For example, as described above with reference to FIG. 3, the plug 64 may cause a reduction in the speed of the aft fluid flow 49. As another example, the plug 64 may cause a greater reduction in the speed of the fluid flow 49 past the shank 50. Furthermore, certain portions of the fluid flow 49 may be accelerated due to the stagnation area(s) associated with the plug 64. For instance, as described above with reference to FIG. 4, the plug may cause an acceleration in the speed of the fluid flow 49 along the sides of the shank 50 relative to the direction of travel 14 of the implement 10.

While certain areas of the fluid flow 49 are expected to be slowed or accelerated, respectively, by the plug 64, it should be appreciated that the geometry, exact location, and size of the plug 64 and other conditions of the field may be unknown before the formation of the plug 64. Further, accelerations and decelerations of the fluid flow 49 may occur at locations difficult or impossible to predict without knowing the size, exact location, and/or geometry of the plug 64. As such, one or more of a reduction in the speed of the fluid flow 49 around (e.g., forward, aft, and/or to the sides of) the ground engaging portion 47 of the shank 50, an increase in the speed of the fluid flow 49 around the ground engaging portion 47 of the shank, and/or a difference between the speed of the forward fluid flow 49A and aft fluid flow 49B may indicate that the shank 50 is clogged and requires corrective measures. Additionally or alternatively, a change in the direction of the fluid flow 49 at any location around the ground engaging portion 47 of the shank 50 may also indicate that the shank 50 is clogged and requires corrective measures.

Accordingly, in several embodiments, the controller 128 may be configured to monitor the sensor data 136 received from the fluid flow sensor(s) 62 and compare one or more monitored values of the fluid flow 49 (e.g., the speed or direction of the fluid flow 49 associated with the shank 50 and/or the ground engaging portion 47 of the shank 50) to a predetermined threshold value(s) set for the shank 50. The threshold value(s) may, for example, correspond to a speed value(s) of the fluid flow 49 (including speed minimums, maximums, and/or ranges) selected such that, when the monitored speed value(s) differs from the corresponding threshold value(s), it may be inferred that the shank 50 is plugged or clogged. As an additional or alternative example, the threshold value(s) may, for instance, correspond to a direction value(s) of the fluid flow 49 (including a minimum angle relative to the direction of travel 14 of the implement 10, a maximum angle relative to the direction of travel 14 the implement 10, and/or a range of angles relative to the direction of travel 14 of the implement 10) selected such that, when the monitored direction value(s) differs from the corresponding threshold value(s), it may be inferred that the shank 50 is plugged or clogged. It should be appreciated that the predetermined threshold value(s) may be the same for each shank 50 and/or shank assembly 51. However, in an alternative embodiment, one or more shanks 50 and/or shank assemblies 51 may be associated with distinct predetermined threshold values.

In additional or alternative embodiments, the sensor data 136 received from the sensor(s) 62 may be monitored to determine instantaneous speed values or direction values for the fluid flow 49 associated with shank(s) 50 and/or average speed values or direction values for the fluid flow 49 associated with the shank(s) 50 over time. When using sensor data 136, the predetermined threshold value(s) used by the controller 128 to detect plugging may, for example, correspond to the predetermined speed threshold(s) and/or direction threshold(s). For example, the predetermined speed threshold or angle threshold may be selected as the minimum speed or angle, respectively, of the fluid flow 49 associated with the shank(s) 50 indicating that the shank(s) 50 are not clogged or plugged. In such instance, the controller 128 may be configured to identify a given shank 50 and/or shank assembly 51 as being plugged when the monitored speed and/or direction value drops below the predetermined speed threshold and/or predetermined direction threshold for a predetermined length of time. For example, a plug 64 may be indicated when the monitored value associated with the fluid flow past the shank 50 drops below the predetermined threshold and stays there for the predetermined length of time.

As another example, the predetermined speed threshold and/or predetermined direction threshold may be selected as the maximum speed or maximum angle, respectively, of the fluid flow 49 associated with the shank(s) 50 indicating that the shank(s) 50 are not clogged or plugged. In such instance, the controller 128 may be configured to identify a given shank 50 and/or shank assembly 51 as being plugged when the monitored speed value and/or monitored angle value increases above the predetermined speed threshold and/or predetermined direction threshold, respectively, for a predetermined length of time. For example, a plug 64 may be indicated when the monitored value associated with the fluid flow 49 past the shank 50 increases above the predetermined threshold and stays there for the predetermined length of time.

As still further example, the predetermined speed threshold and/or predetermined direction threshold may be selected as the speed range or angle range, respectively, of the fluid flow 49 associated with the shank(s) 50 indicating that the shank(s) 50 are not clogged or plugged. In such instance, the controller 128 may be configured to identify a given shank 50 and/or shank assembly 51 as being plugged when the monitored speed value and/or monitored angle value increases above or decreases below the predetermined speed threshold range and/or predetermined direction threshold range, respectively, for a predetermined length of time. For example, a plug 64 may be indicated when the monitored value associated with the fluid flow 49 past the shank 50 increases above or decreases below the predetermined threshold range and stays there for the predetermined length of time.

In accordance with an additional or alternative embodiment, the controller may be configured to monitor the sensor data 136 received from the fluid flow sensors 62A, 62B and determine a difference or differential between one or more of the monitored values (e.g., the speed or direction of the fluid flow 49 associated with the shank 50 and/or the ground engaging portion 47 of the shank 50) of the forward fluid flow 49A and the aft fluid flow 49B and compare such differential with the predetermined threshold value(s) set for the shank 50. In such instance, the threshold value(s) may, for example, correspond to a speed value differential(s) of the fluid flow 49 (including speed differential minimums, maximums, and/or ranges) selected such that, when the difference between the monitored speed values differs from the corresponding threshold value(s), it may be inferred that the shank 50 is plugged or clogged. As an additional or alternative example, the threshold value(s) may, for instance, correspond to a direction value differential(s) of the fluid flow 49 (including a minimum angle differential relative to the direction of travel 14 of the implement 10, a maximum angle differential relative to the direction of travel 14 the implement 10, and/or a range of angle differentials relative to the direction of travel 14 of the implement 10) selected such that, when the monitored direction value(s) differs from the corresponding threshold value(s), it may be inferred that the shank 50 is plugged or clogged.

In such instance, the controller 128 may be configured to identify a given shank 50 and/or shank assembly 51 as being plugged when the difference between the monitored speed and/or direction of the forward fluid flow 49A and aft fluid flow 49B decreases below the predetermined speed differential minimum and/or predetermined direction differential minimum for a predetermined length of time. For example, a plug 64 may be indicated when the monitored differential value drops below the predetermined threshold and stays there for the predetermined length of time. Additionally, or alternatively, the controller 128 may be configured to identify a given shank 50 and/or shank assembly 51 as being plugged when the difference between the monitored speed and/or direction of the forward fluid flow 49A and aft fluid flow 49B increases above the predetermined speed differential maximum and/or predetermined direction differential maximum, respectively, for a predetermined length of time. For example, a plug 64 may be indicated when the monitored differential value increases above the predetermined threshold and stays there for the predetermined length of time. Moreover, as a further example, the controller 128 may be configured to identify a given shank 50 and/or shank assembly 51 as being plugged when the difference between the monitored speed and/or direction of the forward fluid flow 49A and aft fluid flow 49B increases above or decreases below the predetermined speed range differential and/or predetermined direction range differential, respectively, for a predetermined length of time. For example, a plug 64 may be indicated when the difference in the monitored differential value increases above or decreases below the predetermined threshold range and stays there for the predetermined length of time.

In an additional or alternative embodiment, the controller 128 may be configured to determine one or more shanks 50 are plugged by comparing monitored data 136 associated with shanks 50 across multiple shank assemblies 51 and/or multiple shanks 50 of the implement 10. For instance, the controller may 128 be configured to monitor the sensor data 136 associated with a first shank 50 and/or first shank assembly 51 and compare the monitored sensor data 136 to monitored sensor data 136 received from fluid flow sensor(s) 62 associated with a second shank 50 (e.g., a shank 50 of a separate shank assembly 51). Furthermore, it should be recognized that, in at least one embodiment, the first and second shanks 50 may be coupled to the same frame member 38. In such instance, the controller 128 may be configured to identify one of the shanks 50 as plugged when a monitored value indicative of the fluid flow 49 past the first shank 50 (e.g., the ground engaging portion 47 of the first shank 50) differs from a second monitored value indicative of a fluid flow 49 past the second shank 50 of the separate shank assembly 51 by a given threshold or more. In one embodiment, the controller 128 may be configured to determine that at least one of the shanks 50 is plugged when the monitored value associated with the fluid flow 49 past the first shank 50 differs (e.g., is more or less than by a predetermined threshold amount) from the second monitored value associated with the fluid flow 49 past the second shank 50 for a predetermined length of time. In another exemplary embodiment, the controller 128 may be configured to determine at least one of the shanks 50 is plugged when a difference between the monitored value associated with the fluid flow 49 past the first shank 50 and the second monitored value associated with the fluid flow 49 past the second shank 50 increases above or decreases below a predetermined threshold range and stays there for the predetermined length of time. As a still further example, the controller 128 may be configured to determine that at least one of the shanks 50 is plugged when a difference between one or more of the monitored values associated with the forward fluid flow 49A and the aft fluid flow 49B, respectively, of the first shank 50 is more or less than a difference between one or more monitored values associated with a forward fluid flow 49A and the aft fluid flow 49B, respectively, of the second shank 50 by a predetermined threshold amount or when a range of the difference increases above or decreases below a predetermined threshold range and stays there for the predetermined length of time.

Though the above determination is based on the comparison of the monitored value(s) associated with the fluid flow 49 past two shanks 50, it is contemplated such comparison may be utilized with any desirable number of shanks 50 and associated shank assemblies 51. For instance, the monitored value associated with the fluid flow 49 past the one or more shanks 50 may be compared to monitored values associated with the fluid flow 49 past each of the additional shanks 50 and/or shank assemblies 51 to determine whether the shank(s) 50 are plugged.

Generally, in several embodiments, the controller 128 may be configured take into account the speed at which the implement 10 is being moved across the field and determine several of the threshold values described herein based at least in part on the speed of the implement 10. It should be appreciated that several of the characteristics associated with the fluid flow 49 past the shanks 50 may be different at different speeds of the implement 10. For instance, the speed of the fluid flow 49 and/or angle of the fluid flow 49 relative to the forward direction 14 may be greater at faster speeds. In one embodiment, the controller 128 may be communicatively coupled to the speed sensor 71 associated with the implement 10 and/or work vehicle 12 via a wired or wireless connection to allow operational parameter data to be transmitted from the speed sensor 71 to the controller 128 to allow the controller 128 to monitor the ground speed of the implement 10. This speed data may then be utilized to determine one or more of the threshold values described herein. For instance, in one embodiment, separate mathematical expressions or look-up tables may be established for correlating the speed data to the threshold value(s) at differing ground speeds, such as by establishing a mathematical expression or look-up table for each of a plurality of incremental ground speeds (e.g., at each speed defined between 0 MPH and 10 MPH in increments of 0.1 MPH).

It should also be appreciated that the threshold value(s) may be determined by the characteristics of the particular configuration of the ground engaging tool(s). For instance, the threshold value(s) may be affected by the type of tool (e.g., shanks 50, disc blades 46, etc.), the number of ground engaging tools, the size of the ground engaging tool, the desired degree of penetration, and/or the distance between ground engaging tools. However, it should be appreciated that one skilled in the art can contemplate other characteristics of the ground engaging tool(s) that may affect the threshold value(s).

Furthermore, the controller 128 may be configured to initiate one or more control actions when the controller 128 determines that one or more of the ground engaging tools are plugged. For example, the controller 128 may be configured to notify the operator of the implement 10 that one or more shanks 50 are plugged. Specifically, in one embodiment, the controller 128 may be communicatively coupled to the user interface 102 via a wired or wireless connection to allow feedback signals (e.g., indicated by dashed line 138 in FIG. 5) to be transmitted from the controller 128 to the user interface 102. In such an embodiment, the feedback signals 138 may instruct the user interface 102 to provide a notification to the operator of the implement 10 (e.g., by causing a visual or audible notification or indicator to be presented to the operator) that provides an indication that one or more of the disc blades 46 are plugged. In such instances, the operator may then choose to initiate any suitable corrective action he/she believes is necessary, such as adjusting the force applied to the shank assembly(ies) 51 and/or adjusting the position of the shank(s) 50. For example, the operator may adjust the actuator 104 by retracting the rod 106. As such, the shank(s) 50 may rise from an operational position relative to the ground surface as the implement 10 is being moved to a raised position and allow any debris or plug 64 to clear the shank(s) 50. Additionally, raising the shank(s) 50 may reduce a down force applied to the shank assembly(ies) 51 and cause any debris or plug 64 of the shank(s) 50 to force the shank assembly(ies) 51 upward and allow the shank(s) 50 to clear such obstruction. Additionally, as described below, the controller 128 may be configured to actively control the shank assemblies 51 when it is determined that one or more shanks 50 are plugged.

In accordance with aspects of the present subject matter, the controller 128 may be configured to control the operation of the shank assembly(ies) 51 and/or the shank(s) 50 based on the monitored operational parameter(s) deriving from the sensor data 136. Specifically, as shown in FIG. 5, the controller 128 may be communicatively coupled to one or more components of the agricultural implement 10, such as the actuator(s) 104, via a wired or wireless connection to allow control signals (e.g., indicated by dashed lines 146 in FIG. 5) to be transmitted from the controller 128 to the actuator(s) 104. As such, the controller 128 may be configured to transmit control signals 146 to actuator(s) 104 or associated components instructing the actuator 104 to adjust the force being applied to the assembly(ies) 51 and/or the shank(s) 50, such as by extending or retracting the actuator's rod 106 relative to the corresponding cylinder 108. For example, when it is determined that one or more of the shanks 50 are plugged (e.g., when the monitored value associated with the fluid flow 49 past the shank(s) 50 rises above or drops below the predetermined threshold value, when the monitored value drops below or rises above the predetermined range of values threshold, when a differential of the monitored values associated with the fluid flow 49 past the shank(s) 50 rises above or below the predetermined threshold or threshold range and/or when the monitored value differs between shanks 50 and/or shank assemblies 51 by the predetermined threshold), the controller 128 may be configured to transmit control signals 146 to the actuator 104 instructing the actuator 104 to raise the shank assembly 51, and thus the shank 50, from the operational position to the raised position and/or reduce the down force being applied to the shank 50. Additionally, or alternatively, the controller 128 may be configured to transmit control signals to the work vehicle 12 to stop forward motion of the agricultural implement 10. Further, the controller 128 may be configured to transmit control signals to reverse the direction of movement of the agricultural implement 10 to reposition the agricultural implement 10, raise the plugged shank assembly 51 to a raised position, resume forward movement of the agricultural implement 10 past the previous position and the plug 64, and lower the shank assembly 51 to a cultivating position to continue the cultivating operation.

As further illustrated in FIG. 5, the controller 128 may be configured to control operation of the fluid flow system 70 and/or the flow generator 72 in order to increase the magnitude of the fluid flow 49. As such, the controller 128 may be communicatively coupled to one or more components of the fluid flow system 70, such as the flow generator 72, via a wired or wireless connection to allow control signals (e.g., indicated by dashed lines 142 in FIG. 5) to be transmitted from the controller 128 to the fluid flow system 70. As such, the controller 128 may be configured to transmit control signals 142 to the fluid flow system 70 or associated components instructing the fluid flow system 70 to adjust the fluid flow past the shank(s) 50, such as by powering or adjusting an output of the fluid generator 72. For example, the controller 128 may be configured to transmit control signals 142 to the fluid flow system 70 instructing the flow generator 72 to provide a continuous additional fluid flow 49 forward of the shank(s) 50. Alternatively, the controller 128 may be configured to periodically transmit control signals 142 to the fluid flow system 70 instructing the flow generator 72 to provide additional fluid flow 49 forward of the shank(s) 50 when it is desirable to check the operational status of the shank(s) 50, such as for the plugged condition.

Referring now to FIG. 6, a flow diagram of one embodiment of a method 200 for detecting the operational status of one or more ground engaging tool of an agricultural implement is illustrated in accordance with aspects of the present subject matter. In general, the method 200 will be described herein with reference to the implement 10 and the system 100 described above with reference to FIGS. 1-5. However, it should be appreciated by those of ordinary skill in the art that the disclosed method 200 may generally be utilized to detect the operational status of any agricultural implement including one or more ground engaging tools having any suitable implement configuration and/or in connection with any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (202), the method 200 may include monitoring a fluid flow past the ground engaging tools as the agricultural implement is moved across the field. For instance, as described above, the controller 128 may be communicatively coupled to one or more sensors, such as a fluid flow sensor(s) 62, which are configured to capture data 136 indicative of a fluid flow 49 past the shank 50, such as the ground engaging portion 47 of the shank 50. As such, the controller 128 may be configured to monitor the fluid flow 49 or one or more parameters of the fluid flow 49 (e.g., the speed or direction of the fluid flow 49) based on the sensor data 136 received from the fluid flow sensor(s) 62.

Additionally, at (204), the method 200 may include comparing at least one monitored value associated with the fluid flow past the ground engaging tool as the agricultural implement is moved across the field to a predetermined threshold value set for the ground engaging tool. For example, as described above, the controller 128 may be configured to monitor the speed or direction of the fluid flow 49 past the shank 50 at one or more locations surrounding the ground engaging portion 47 of the shank 50 based on data 136 received from the fluid flow sensor(s) 62 and compare such monitored value(s) to a predetermined threshold value(s) set for the shank 50. As a further example, the controller 128 may be configured to compare such monitored value(s) to a predetermined threshold range set for the shank 50. As an additional or alternative example, the controller 128 may be configured to determine a differential between a monitored value(s) of the forward fluid flow 49A and a monitored value(s) of the aft fluid flow 49B and compare such differential(s) to the predetermined threshold value.

Furthermore, at (206), the method 200 may include identifying an operational status of the ground engaging tool based at least in part on the comparison between the at least one monitored value and the predetermined threshold value. In one instance, as described above, the controller 128 may be configured to identify that a shank 50 is plugged when the monitored value(s) associated with the fluid flow 49 past the shank 50 drops below the predetermined threshold value for a predetermined length of time. In an additional or alternative example, the controller 128 may be configured identify that a shank 50 is plugged when the monitored value(s) increases above the predetermined threshold value for a predetermined length of time. In a still further example, the controller 128 may be configured to identify that a shank 50 is plugged when the monitored value(s) decreases below or increases above the predetermined threshold range for a predetermined length of time. In another instance, the controller 128 may be configured to identify that a shank 50 is plugged when the differential between the monitored value(s) of the forward fluid flow 49A and the monitored value(s) of the aft fluid flow 49B is equal to or greater than the predetermined threshold or when such differential increases above or decreases below the predetermined threshold range for a predetermined length of time. As an alternative or additional example, the controller 128 may be configured to identify that the shank 50 is plugged when the monitored value(s), range of monitored value(s), or differential(s) between monitored values differs from a monitored value(s), range of monitored value(s), or differential(s) between monitored values associated with a fluid flow past a second shank 50 by the predetermine threshold value for a predetermined length of time.

Moreover, the method 200 may, for example, include initiating a control action based on the identified operational status of the ground engaging tool. For example, as described above, when plugging is identified, the controller 128 may be configured to notify an operator of the agricultural implement 10, automatically adjust a position of the disc shank(s) 50 relative to a ground surface across which the agricultural implement 10 is being moved, and/or adjust a force being applied to the shank(s) 50. Specifically, as described above, the controller 128 may be configured to transmit control signals 138 to the user interface 102 and/or transmit control signals 146 to the actuator(s) 104 to adjust one or more operating parameters of the shank(s) 50, such as the position of the shank(s) 50 and/or the force being applied thereto, based on the detection of plugging. As another example, the controller 128 may be configured to transmit control signals to stop the forward movement of the agricultural implement 10, reverse the direction of movement of the agricultural implement 10 to reposition the agricultural implement 10, raise the plugged shank(s) 50 to a raised position, resume forward movement of the agricultural implement 10 past the plug 64, and/or lower the shank(s) 50 to a cultivating position to continue the cultivating operation.

In one instance, the method 200 may include introducing, at least in part, the fluid flow 49 forward of the ground engaging portion of the ground engaging tool relative to the direction of travel 14 of the agricultural implement utilizing the fluid flow system 70. For instance, as described above, the fluid flow system 70 may be configured to introduce additional fluid flow 49 forward of the shank(s) 50. For example, the controller 128 may be configured to transmit control signals 142 to the fluid flow system 70 such that the flow generator 72 is powered to continuously supply additional fluid flow 49 or periodically supply the additional fluid flow 49 when it is desirable to check the shank(s) 50 for the plugged condition. Additionally, the method 200 may include introducing at least one tracer particle 66 to the fluid flow 49 forward of the ground engaging portion of the ground engaging tool relative to the direction of travel 14 utilizing the fluid flow system 70. For example, as described above, the fluid flow system 70 may be configured to introduce tracer particles 66 forward of the ground engaging portion(s) 47 of the shank(s) 50.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting the operational status of ground engaging tools for agricultural implements, the system comprising:
   an agricultural implement including a frame and a ground engaging tool coupled to the frame, a ground engaging portion of the ground engaging tool configured to engage soil within a field as the agricultural implement is moved across the field;
   at least one sensor supported relative to the frame, the at least one sensor configured to capture data indicative of a fluid flow past the ground engaging tool and between the soil and the frame as the agricultural implement is moved across the field; and
   a controller configured to monitor the data received from the at least one sensor, compare a direction associated with the fluid flow past the ground engaging tool as the agricultural implement is moved across the field to a predetermined threshold direction value, and identify an operational status of the ground engaging tool based at least in part on a comparison between the direction associated with the fluid flow past the ground engaging tool as the agricultural implement is moved across the field and the predetermined threshold direction value.

2. The system of claim 1, wherein the at least one sensor is oriented to capture data indicative of the fluid flow aft of the ground engaging portion of the ground engaging tool relative to a direction of travel of the implement.

3. The system of claim 2, wherein the at least one sensor comprises a first sensor supported relative to the frame and oriented to capture data indicative of the fluid flow aft of the ground engaging portion of the ground engaging tool relative to the direction of travel and a second sensor supported relative to the frame and oriented to capture data indicative of the fluid flow forward of the ground engaging portion relative to the direction of travel, and
   wherein the controller is further configured to identify the ground engaging tool as plugged when a differential between at least one monitored value associated with the fluid flow forward of the ground engaging portion of the ground engaging tool and at least one monitored value associated with the fluid flow aft of the ground engaging portion of the ground engaging tool is equal to or greater than the predetermined threshold value.

4. The system of claim 1, wherein the at least one sensor is oriented to capture data indicative of the fluid flow to a side of the ground engaging portion of the ground engaging tool relative to a direction of travel of the implement.

5. The system of claim 1, wherein the at least one sensor is configured to capture data indicative of at least one of a speed or direction of the fluid flow past the ground engaging tool as the agricultural implement is moved across the field.

6. The system of claim 1, wherein the at least one sensor is configured to track at least one tracer particle within the fluid flow past the ground engaging tool.

7. The system of claim 1, further comprising:
a fluid flow system associated with the agricultural implement, the fluid flow system including a flow generator and a fluid flow outlet fluidly coupled to the flow generator and positioned forward of the ground engaging portion of the ground engaging tool relative to the direction of travel, the fluid flow system configured to at least partially introduce the fluid flow forward of the ground engaging portion of the ground engaging tool relative to the direction of travel of the implement.

8. The system of claim 7, wherein the fluid flow system is further configured to introduce at least one tracer particle to the fluid flow forward of the ground engaging portion of the ground engaging tool relative to the direction of travel of the implement.

9. The system of claim 1, wherein the controller is further configured to initiate a control action based on the identified operational status of the ground engaging tool.

10. The system of claim 1, wherein the at least one sensor comprises at least one of a camera, an optical sensor, a RADAR sensor, an ultrasonic transceiver, or a motion detector.

11. The system of claim 1, wherein the ground engaging tool comprises a shank.

12. A method for detecting the operational status of a ground engaging tool of an agricultural implement, the method comprising:
monitoring, with the computing device, a fluid flow past the ground engaging tool as the agricultural implement is being moved across the field;
comparing a direction associated with the fluid flow past the ground engaging tool as the agricultural implement is moved across the field to a predetermined threshold direction value; and
identifying an operational status of the ground engaging tool based at least in part on the comparison between the direction associated with the fluid flow past the ground engaging tool and the predetermined threshold direction value.

13. The method of claim 12, wherein monitoring the fluid flow past the ground engaging tool comprises receiving, with the computing device, data from a sensor configured to detect a parameter indicative of the fluid flow aft of a ground engaging portion of the ground engaging tool relative to a direction of travel of the implement, and wherein identifying the operational status of the ground engaging tool comprises identifying that the ground engaging tool is plugged when the direction associated with the fluid flow aft of the ground engaging portion of the ground engaging tool as the agricultural implement is moved across the field differs from the predetermined threshold direction value.

14. The method of claim 12, wherein monitoring the fluid flow past the ground engaging tool comprises receiving, with the computing device, data from a first sensor configured to detect a parameter indicative of the fluid flow aft of a ground engaging portion of the ground engaging tool relative to a direction of travel of the implement and receiving, with the computing device, data from a second sensor configured to detect a parameter indicative of the fluid flow forward of the ground engaging portion relative to the direction of travel of the implement, and wherein identifying the operational status of the ground engaging tool comprises identifying that the ground engaging tool is plugged when a differential between the direction associated with the fluid flow forward of the ground engaging portion of the ground engaging tool and the direction associated with the fluid flow aft of the ground engaging portion of the ground engaging tool is equal to or greater than the predetermined threshold direction value.

15. The method of claim 12, further comprising:
comparing a speed of the fluid flow past the ground engaging tool as the agricultural implement is moved across the field to a speed threshold value.

16. The method of claim 15, wherein monitoring the fluid flow past the ground engaging tool comprises monitoring, with the computing device, at least one tracer particle within the fluid flow past the ground engaging tool.

17. The method of claim 12, further comprising:
initiating a control action based on the identified operational status of the ground engaging tool, wherein the control action comprises at least one of notifying an operator of the agricultural implement of the operational status of the ground engaging tool, adjusting a position of the ground engaging tool relative to a ground surface across which the agricultural implement is being moved, or adjusting an actuator force being applied to the ground engaging tool.

18. The method of claim 12, wherein identifying the operational status of the ground engaging tool comprises identifying that the ground engaging tool is plugged when a differential between the direction associated with the fluid flow past the ground engaging tool and the direction associated with the fluid flow past a second ground engaging tool is equal to or greater than the predetermined threshold value.

19. The method of claim 12, further comprising:
introducing, at least in part, the fluid flow forward of the ground engaging portion of the ground engaging tool relative to a direction of travel of the agricultural implement utilizing a fluid flow system.

20. A system for detecting the operational status of ground engaging tools for agricultural implements, the system comprising:
an agricultural implement including a frame and a ground engaging tool coupled to the frame, a ground engaging portion of the ground engaging tool configured to engage soil within a field as the agricultural implement is moved across the field;
at least one sensor supported relative to the frame, the at least one sensor configured to capture data indicative of at least one of a speed or direction of a fluid flow past the ground engaging tool as the agricultural implement is moved across the field; and
a controller configured to monitor the data received from the at least one sensor, compare a direction associated with the fluid flow past the ground engaging tool as the agricultural implement is moved across the field to a predetermined threshold direction value, and identify an operational status of the ground engaging tool based at least in part on a comparison between the direction associated with the fluid flow past the ground engaging tool as the agricultural implement is moved across the field and the predetermined threshold direction value.

* * * * *